United States Patent [19]

Ikeda

[11] Patent Number: 4,653,948
[45] Date of Patent: Mar. 31, 1987

[54] TRACT WIRE TIGHTENING DEVICE FOR CARRIAGE OF PRINTER

[75] Inventor: Hiroshi Ikeda, Tokorozawa, Japan

[73] Assignee: Citizen Watch Co., Ltd., Tokyo, Japan

[21] Appl. No.: 686,683

[22] Filed: Dec. 27, 1984

[30] Foreign Application Priority Data

Dec. 28, 1983 [JP] Japan .......................... 58-199278[U]

[51] Int. Cl.[4] ..................... B41J 19/56; B65H 19/26; F16H 7/14
[52] U.S. Cl. ................................ 400/335; 400/331.2; 400/341; 242/147 R; 474/117
[58] Field of Search ............... 400/291, 331.2, 333.2, 400/335, 336, 341, 320, 322, 336.1, 340, 355; 242/147 R; 474/110, 113, 115, 117, 133, 136, 138

[56] References Cited

U.S. PATENT DOCUMENTS

| | | | |
|---|---|---|---|
| 2,894,051 | 7/1959 | Gassman | 474/117 X |
| 4,241,614 | 12/1980 | Gould et al. | 474/117 X |
| 4,395,151 | 7/1983 | Krenz | 400/335 X |
| 4,484,485 | 11/1984 | Matsuhisa | 400/322 X |

FOREIGN PATENT DOCUMENTS

| | | | |
|---|---|---|---|
| 713530 | 11/1941 | Fed. Rep. of Germany | 400/336 |
| 2147149 | 3/1973 | Fed. Rep. of Germany | 400/335 |
| 2611921 | 9/1977 | Fed. Rep. of Germany | 400/335 |
| 2201366 | 9/1973 | France | 242/147 R |
| 41204 | 3/1980 | Japan | 400/335 |
| 169386 | 10/1982 | Japan | 400/335 |
| 29690 | 2/1983 | Japan | 400/320 |
| 359746 | 10/1931 | United Kingdom | 474/117 |
| 895827 | 5/1962 | United Kingdom | 242/147 R |
| 972353 | 10/1964 | United Kingdom | 474/117 |
| 1153379 | 5/1969 | United Kingdom | 98/88.1 |
| 1381740 | 1/1975 | United Kingdom | 474/117 |
| 1385385 | 2/1975 | United Kingdom | 474/117 |
| 1438397 | 6/1976 | United Kingdom | 474/117 |
| 1446476 | 8/1976 | United Kingdom | 474/25 |

Primary Examiner—Edgar S. Burr
Assistant Examiner—James R. McDaniel
Attorney, Agent, or Firm—Lowe Price Leblanc Becker & Shur

[57] ABSTRACT

In a tract wire tightening device for a carriage of a printer, a wire connected to the carriage is looped around pulleys. A motor to drive the wire is movable with respect to a base. A spring is interposed between the motor and the base so as to bias the pulley which is interlocked with the motor.

5 Claims, 2 Drawing Figures

TRACT WIRE TIGHTENING DEVICE FOR CARRIAGE OF PRINTER

BACKGROUND OF THE INVENTION (a) Field of the Invention

The present invention relates to a device for tightening a tract wire of a carriage of a printer.

(b) Description of the Prior Art

In a conventional tract wire tightening device for a carriage of a printer, as shown in FIG. 1, a wire 3 is connected to a carriage 1 through a tension spring 2. The wire 3 is looped around a second pulley 8 mounted on a shaft 9 and a first pulley 6 mounted on a shaft 5 of a motor 4, and is driven by the first pulley 6. Thus, the carriage 1 is slid on a bar 7. In this tract wire tightening device, when the biasing force of the tension spring 2 is increased, forces acting on the shafts 5 and 9 mounting the first and second pulleys 6 and 8 around which the wire 3 is looped are increased. Hence, the frictional force acting on the bearings supporting shafts 5 and 9 is increased, so that an output from the motor 4 must be increased.

On the other hand, when the biasing force of the tension spring 2 is decreased, linear movement of the carriage 1 is easily disturbed due to load variations of the carriage 1.

It is an object of the present invention to provide a small, lightweight and inexpensive tract wire tightening device for a carriage of a printer, which uses a load exerted by a spring biasing force and an inertia load as loads for displacement of the pulley shafts and uses the mass of a motor as the inertia load, which can maintain normal linear movement of the carriage even if the carriage is subject to load variation without requiring the wire to be kept taut to an extent that frictional force acting on the pulley shafts is inadvertently increased, and which can reduce frictional force acting on the pulley shafts.

In order to achieve the above objects of the present invention, there is provided a tract wire tightening device for a carriage of a printer in which a wire connected to a carriage is looped around a pulley interlocked with a motor and the wire is kept taut, wherein the motor is movable relative to a base in a direction to tighten the wire, and a spring is arranged between the motor and the base to apply a biasing force to tighten the wire.

With a device of the above construction, the present invention has the following effects:

(1) A spring for applying a biasing force is connected to a wire and an inertia body is added. Therefore, elongation of the wire over time is absorbed. Vibrations of the pulleys by the tension spring which are caused during acceleration or deceleration upon a running direction change of the carriage are prevented. Variations in the running speed of the carriage are reduced, and an excessive side pressure does not act on the shafts on which the pulleys are mounted. The device therefore has excellent durability.

(2) Since the motor for driving the carriage is used as the inertia body, need for extra components, space and weight is eliminated and the device is rendered compact, light in weight and inexpensive.

DETAILED DESCRIPTION OF THE PREFERRED EMBODIMENT

Figure 1:
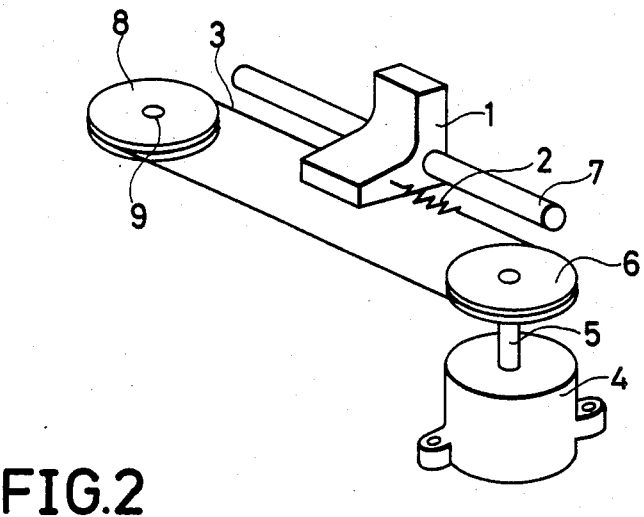
FIG. 1 is a perspective view of a conventional tract wire tightening device of a carriage of a printer.
Figure 2:
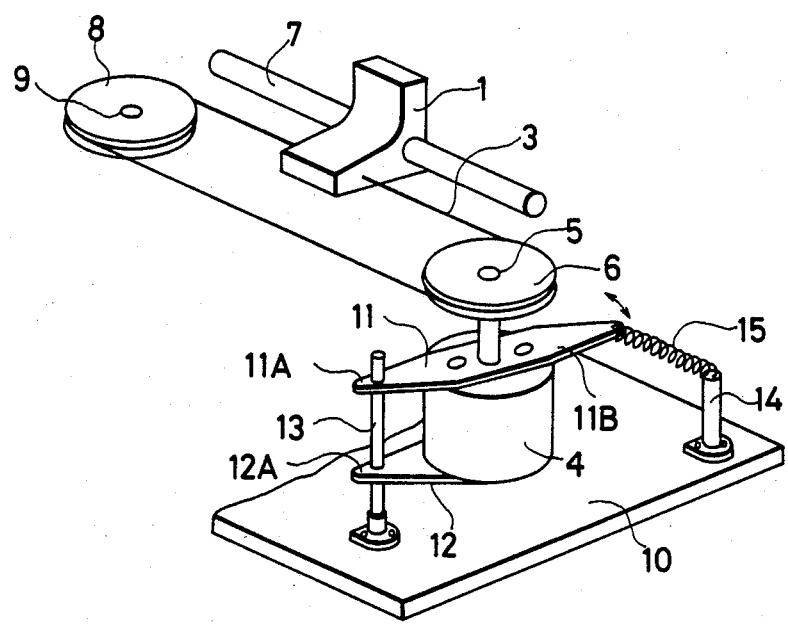
FIG. 2 is a perspective view showing an embodiment of the present invention.

FIG. 2 shows an embodiment of the present invention, and the same reference numerals as in FIG. 1 denote the same parts in FIG. 2. A steel wire 3 is connected to the two sides of a carriage 1 which is slid on a bar 7. The wire 3 is looped around first and second pulleys 6 and 8. A motor 4 for rotating the first pulley 6 through a shaft 5 is supported by upper and lower support rod members or rods 11 and 12. One end 11A or 12A of the upper or lower support rod 11 or 12, respectively, is pivotally mounted on a support shaft 13 extending upright on a base 10. The motor 4 supports the wire 3 to be movable in a direction to tighten or slacken it with respect to the base 10. A tension spring 15 is hooked between the other end 11B of the upper support rod 11 and a support column 14 extending upright on the base 10.

The motor 4 and the first pulley 6 are biased in a direction to separate from the carriage 1 and the second pulley 8 with respect to the support shaft 13. The wire 3 is thus normally kept taut between the first and second pulleys 6 and 8. The pulley 6, interlocked with the motor 4, is biased by the tension spring 15.

I claim:

1. A tract wire tightening device for a reciprocating carriage of a printer, in which a wire connected to the carriage is looped around plural pulleys including a pulley attached to a shaft of a motor and means to keep said wire taut, said means comprising:

a base;

a support shaft fixed to said base;

a support member having two ends, a motor fixed to said support member, said support member being pivotably supported at a first end by said support shaft such that said support member and said motor are movable as a unit relative to said base in an arcuate path which is substantially parallel to the direction of motion of said reciprocating carriage during use of said printer; and a tension spring connected between a second end of said support member and said base, said tension spring urging, through said support member, said motor and said pulley in a direction to tighten said wire.

2. A device according to claim 1, wherein said wire is a steel wire.

3. A device according to claim 1, further comprising: a second pulley rotatably mounted within said printer, with said wire looped around both said first and second pulleys and extending therebetween.

4. A device according to claim 1, wherein: said motor is fixed to said support member intermediate said first and second ends thereof.

5. A device according to claim 1, further comprising: a tension spring connection column extending from said base for said connection of said spring to said base thereat.

* * * * *